(12) United States Patent
Tanaka et al.

(10) Patent No.: US 9,834,167 B2
(45) Date of Patent: Dec. 5, 2017

(54) AIRBAG FABRIC AND AIRBAG

(71) Applicant: Toray Industries, Inc., Tokyo (JP)

(72) Inventors: Nobuaki Tanaka, Otsu (JP); Satoshi Yamada, Otsu (JP)

(73) Assignee: Toray Industries, Inc. (JP)

( * ) Notice: Subject to any disclaimer, the term of this patent is extended or adjusted under 35 U.S.C. 154(b) by 330 days.

(21) Appl. No.: 14/758,297

(22) PCT Filed: Jan. 27, 2014

(86) PCT No.: PCT/JP2014/051617
§ 371 (c)(1),
(2) Date: Jun. 29, 2015

(87) PCT Pub. No.: WO2014/115864
PCT Pub. Date: Jul. 31, 2014

(65) Prior Publication Data
US 2015/0336530 A1 Nov. 26, 2015

(30) Foreign Application Priority Data
Jan. 28, 2013 (JP) .................................. 2013-013153

(51) Int. Cl.
*B60R 21/235* (2006.01)
*D06C 19/00* (2006.01)
*D03D 1/02* (2006.01)

(52) U.S. Cl.
CPC ............. *B60R 21/235* (2013.01); *D03D 1/02* (2013.01); *D06C 19/00* (2013.01); *B60R 2021/23509* (2013.01); *B60R 2021/23542* (2013.01); *D10B 2505/124* (2013.01); *Y10T 442/30* (2015.04); *Y10T 442/313* (2015.04)

(58) Field of Classification Search
CPC .......... B60R 2021/23509; B60R 2021/23542; B60R 21/235; D03D 1/02; D06C 19/00; D10B 2505/124; Y10T 442/30; Y10T 442/313
See application file for complete search history.

(56) References Cited

U.S. PATENT DOCUMENTS

2013/0328293 A1 12/2013 Kuramoto

FOREIGN PATENT DOCUMENTS

| JP | 2002-212857 A | 7/2002 |
| JP | 2007-196993 A | 8/2007 |
| JP | 2007-224486 A | 9/2007 |
| JP | 2012-52280 A | 3/2012 |
| WO | 2012/120985 A1 | 9/2012 |

*Primary Examiner* — Arti Singh-Pandey
(74) *Attorney, Agent, or Firm* — DLA Piper LLP (US)

(57) ABSTRACT

An airbag fabric is excellent in slippage amount and strength in a sewn portion. The airbag fabric is made of a synthetic fiber, the fabric having a constant (load of 98 N/30 mm) elongation of 1 to 5% and having a residual strain rate of 0.1 to 1.5%, the residual strain rate being obtained when the fabric is allowed to stand still for 10 minutes from the removal of the 98 N/30 mm load after the retention of the fabric for 10 minutes while the 98 N/30 mm load is applied to the fabric. The strength in the sewn portion is preferably 1200 N or more in each of the warp and the weft.

15 Claims, 2 Drawing Sheets

AIRBAG FABRIC AND AIRBAG

TECHNICAL FIELD

This disclosure relates to an airbag fabric, and an airbag made of the fabric.

BACKGROUND

In recent years, as an occupant protecting instrument for automobiles, the fitting of airbags has been rapidly spreading. The number of airbags fitted to automobiles has been increasing, examples of the airbags including an airbag for the driver seat and an airbag for the assistant driver's seat against frontal collision, airbags to protect femoral regions, fitted into seat sheets against lateral collision, and curtain airbags to be deployed along side windows. Furthermore, it is desired from the viewpoint of the downsizing of vehicles and an improvement in safety to deploy such an airbag at a high speed. Thus, the gas output of an inflator that generates gas to deploy the airbag is frequently set to a high level. However, an increase in the gas output with deployment of airbag at a high speed makes the inner pressure of the airbag high so that a large burden is given to sewn portions present in the airbag. For this reason, a request has been made that slippages between its fabric and its sewing threads should be reduced.

Thus, JP 2012-52280 A suggests an airbag fabric using yarns having a relatively low fineness of 200 to 320 dtex and high strength, and states that this makes it possible to give a fabric light in weight and high in strength. JP 2012-52280 A also states that use of the low fineness yarns makes an airbag small and light in weight and makes the outer surface of the airbag smooth so that the airbag can be deployed at a high speed.

JP 2007-196993 A suggests an airbag in which a resin containing a cobalt pigment is applied to a fabric to give excellent strength in a sewn portion and excellent edgecomb resistance.

However, the fabric disclosed specifically in JP 2012-52280 A is a fabric in which the density in the warp is larger than that in the weft. In that fabric, the balance between the elongation in the warp and that in the weft is poor so that when a high-temperature gas inflator is used, slippages are easily generated in the sewn portion of the airbag. Thus, that fabric is not sufficiently satisfied.

According to JP 2007-196993 A, the airbag is improved in strength of its sewn portion and in edgecomb resistance. However, when the fabric of that airbag is used in an airbag using a high-output inflator, the fabric is not yet sufficient in elongation, which has a large influence onto slippages in the sewn portion. Thus, it is difficult to apply that fabric, as it is, to such an airbag using a high-output inflator.

In light of such a background of conventional airbags, it could be helpful to provide an airbag fabric having excellent dimension stability and keeps its mechanical properties, and which is excellent in slippage amount and strength in the sewn portion against a burden onto the sewn portion of the airbag when the airbag is expanded and deployed; and an airbag comprising the airbag fabric.

SUMMARY

We thus provide:

(1) An airbag fabric comprising a synthetic fiber, the fabric having a constant elongation of 1 to 5% and a residual strain rate of 0.1 to 1.5% in each of a warp and a weft of the fabric, and the constant elongation and the residual strain rate being calculated by measuring methods below, respectively:

constant elongation $(EP)$ (%)=$(L2-L1)/L1 \times 100$, and residual strain rate $(ES)$ (%)=$(L3-L1)/L1 \times 100$ wherein L1: a distance between marked lines on the fabric when an initial load of 1.96 N/30 mm is applied to the fabric;

L2: a distance between the marked lines after the fabric has been retained for 10 minutes while a load of 98 N/30 mm has been applied to the fabric; and L3: a distance between the marked lines when the initial load of 1.96 N/30 mm is applied to the fabric after the fabric has been allowed to stand still for 10 minutes from the removal of the 98 N/30 mm load after the retention of the fabric for 10 minutes while the 98 N/30 mm load is applied to the fabric.

(2) The airbag fabric according to the above, which has a strength in the sewn portion of 1200 N or more in each of the warp and the weft.

(3) The airbag fabric according to any of the above, wherein a warp yarn and a weft yarn each have a total fineness of 350 to 700 dtex, and each have a monofilament fineness of 2.5 to 7 dtex.

(4) The airbag fabric according to any of the above, which has a cover factor of 1800 to 2300.

(5) An airbag comprising the airbag fabric according to any of the above.

(6) A method of producing an airbag fabric, the method being a method of using a weaving machine to produce the airbag fabric according to any of the above, wherein warping into the warp is performed under conditions of using a warping sheet tension of 40 to 50 gf per yarn of the warp (392 to 490 mN per yarn of the warp), and a beamer sheet tension of 70 to 90 gf per yarn of the warp (686 to 883 mN per yarn of the warp).

(7) The method of producing an airbag fabric according to the above, wherein the weaving is performed under a condition of using a warp tension of the weaving of 100 to 250 gf per yarn of the warp (981 to 1961 mN per yarn of the warp).

(8) A method of producing an airbag fabric, comprising, after the weaving recited in the above, the step of scouring a resultant workpiece at a temperature of 20 to 80° C., and further heatsetting a scoured workpiece at a temperature of 110 to 190° C.

When an airbag is produced by use of the fabric, the airbag is excellent in slippage amount, strength in the sewn portion and dimension stability against a burden onto the sewn portion of the airbag.

DESCRIPTION OF REFERENCE SIGNS

1: Sample for measuring strength in sewn portion
2: Front-side grip contacting portion
3: Rear-side contacting portion 4: Seam
5: Front surface
6: Rear surface
7: Cut ends
8: Thread ends
11: Sample for measuring slippage amount
12: Chuck contacting portions
13: Seam
14: Cut ends
15: Thread ends
A: Cramp interval
B: Width direction
C: Cramp interval

DETAILED DESCRIPTION

The airbag fabric is preferably made of multifilament yarns. Examples of a fiber used to form the multifilament yarns include polyamide fiber, polyester fiber, aramid fiber, rayon fiber, polysulfone fiber, and super high-molecular-weight polyethylene fiber. Of these fibers, preferred are polyamide fiber and polyester fiber, which are excellent in mass-productivity and economical efficiency.

The polyamide fiber may be, for example, a fiber made of nylon 6, nylon 66, nylon 12, nylon 46, a copolymerized polyamide of nylon 6 and nylon 66, or a copolymerized polyamide obtained by copolymerizing a polyalkylene glycol, a dicarboxylic acid, an amine, or some other with nylon 6. A nylon 6 fiber and a nylon 66 fiber are, in particular, excellent in impact resistance, and thus are preferable.

The polyester fiber may be, for example, a fiber made of polyethylene terephthalate, polybutylene terephthalate, or some other. The polyester fiber may be a fiber made of a copolymerized polyester obtained by copolymerizing, as an acid component, isophthalic acid, sodium 5-sulfoisophthalate, adipic acid, and other aliphatic dicarboxylic acids with polyethylene terephthalate or polybutylene terephthalate.

The fiber constituting the multifilament yarns preferably contains a heat stabilizer, an antioxidant, a light stabilizer, a lubricant, an antistatic agent, a plasticizer, a thickener, a pigment, a flame retardant, and others.

The antioxidant is added for the purpose that the airbag fabric maintains good mechanical strength even when the airbag is mounted in an automobile over a long term, for example, 10 years or longer. The antioxidant is preferably, for example, a copper salt. When the copper salt is used, the copper content in the polymer that forms the fiber is preferably from 10 to 300 ppm. When the copper content is set to 10 ppm or more, preferably to 30 ppm or more, more preferably to 50 ppm or more, the airbag fabric can achieve an actually effective improvement in environment resistance and thermal-aging resistance. When the copper content is set to 300 ppm or less, preferably to 200 ppm or less, more preferably to 100 ppm or less, the deterioration of operability when the material is spun can be prevented.

The same multifilament yarns are preferably rendered the warp yarn and the weft yarn of the fabric since the balance in crimp ratio between the warp and the weft, which is dependent on the finenesses, strengths and elongations of the two, is made good. The wording "the same multifilament yarns are rendered the warp yarn and the weft yarn of the fabric" denotes that the warp yarn and the weft yarn are made of the same polymer, have the same monofilament fineness, and have the same total fineness. The wording "the same polymer" denotes polymers in which their main repeating units are common to each other, such as nylons 66, or polyethylene terephthalates. However, a combination of a homopolymer with a copolymer is also allowable as the same polymers described herein. Since the warp yarn and the weft yarn do not need to be distinguished from each other, it is also preferred to control production of the two, to adopt the following: whether or not a copolymerizable component is present in the warp yarn and the weft yarn, or the kind and amount of the structural units of the copolymer in the warp yarn are the same as those of the copolymer in the weft yarn. The wording "the same monofilament fineness" denotes that the difference between monofilament fineness of the warp yarn and that of the weft yarn is within 5% of smaller one of the two. The wording "the same total fineness" denotes that the difference between the total fineness of the warp yarn and that of the weft yarn is within 5% of smaller one of the two.

It is important for the airbag fabric to have a constant elongation of 1 to 5% in each of the warp and the weft of the fabric. The constant elongation is preferably 4.5% or less. When the constant elongation is less than 5%, the fabric is excellent in form stability, and the slippage amount in a sewn portion of the airbag becomes small. When the slippage amount becomes large, high-temperature gas flows into open gaps of the fabric so that the bag is easily burst.

It is also important to have a residual strain rate of 0.1 to 1.5%. The residual strain rate is preferably 0.1% or more while the rate is preferably 1.2% or less. When the residual strain rate is smaller than 1.5%, the fabric is favorably excellent in form stability as well so that the bag is stabilized in shape when deployed at a high speed.

In the multifilament yarns used for the airbag fabric, the total fineness thereof is preferably from 350 to 700 dtex, more preferably from 350 to 560 dtex in order that the airbag fabric can ensure mechanical properties required, in particular, excellent tensile strength and tear strength. When the multifilament yarns having a total fineness of 350 dtex or more are used, the fabric easily achieves strength sufficient for airbag fabrics. When the total fineness is set to 700 dtex or less, the fabric is favorably made good in flexibility for airbag fabrics, and made good in storing- and fabricating-operability when the airbag is folded. The monofilament fineness is preferably 2.5 to 7 dtex, more preferably 2.8 dtex or more, even more preferably 3 dtex or more. The monofilament fineness is also preferably 6.8 dtex or less, more preferably 6.6 dtex or less. When the monofilament fineness is set in the low range as described above, obtained is such an advantageous effect that the synthetic fiber filaments are lowered in rigidity so that the fabric is favorably improved in flexibility. Moreover, the synthetic fiber filaments can be prevented from being melted by heat of high-temperature gas discharged from the inflator.

Examples of the texture of the fabric include plain weave, twill weave, and satin weave; respective fancy weaves of these weaves; and multiaxis weave. Of these weaves, plain weave is preferred since the weave is excellent in dimension stability and mechanical properties, and is a thin cloth.

The density of the airbag fabric is preferably a density good in balance between the warp and the weft. Specifically, the difference in density between the warp and the weft is preferably within 5% of smaller one of the respective densities of the warp and the weft, more preferably within 3%. Even more preferably, the density of the warp is substantially equal to that of the weft.

The cover factor of the airbag is preferably from 1800 to 2300, more preferably from 1850 to 2260. When the fabric is large in cover factor, the fabric easily achieves high strength but becomes large in weight per unit area to easily turn into a hard cloth. Thus, the cover factor is controlled preferably to 2300 or less. When the fabric is made low in cover factor, the fabric becomes small in weight per unit area so that the slippages are not easily reduced. Thus, the lower limit of the cover factor is preferably 1800.

The cover factor is represented by $(D1 \times 0.9)^{1/2} \times N1 + (D2 \times 0.9)^{1/2} \times N2$, wherein D1 denotes the total fineness of the warp yarn (dtex); N1 denotes the density of the warp yarn (the number of warp yarns per 2.54 cm); D2 denotes the total fineness of the weft yarn (dtex); and N2 denotes the density of the weft yarn (the number of weft yarns per 2.54 cm).

The airbag fabric preferably has a thickness of 0.35 mm or less from the viewpoint of lightness in weight and storability. From the same viewpoint, the weight per unit area is preferably 250 g/m² or less. Recently, in particular, airbag modules have been downsized. Thus, it has also been becoming an important theme to downsize a main body of an airbag. When such a request is made, the thickness of the airbag when the airbag is folded, and the weight and flexibility of the airbag may not be satisfied when the thickness and the weight per unit are each over the range.

The airbag fabric preferably has a strength in the sewn portion of 1200 N or more, more preferably 1250 N or more. From the viewpoint of the toughness of the airbag, the upper limit thereof is preferably 2000 or less, more preferably 1900 or less. When the strength in the sewn portion is 1200 N or more, the slippage amount of a sewn portion of the airbag becomes small so that high-temperature gas does not easily flow into open gaps of the airbag. Thus, the bag is not easily burst. The slippage amount is set preferably to 2.0 mm or less, more preferably to 1.5 mm or less.

The strength in the sewn portion and the slippage amount are measured by methods described later.

A preferred method of producing the airbag fabric is not particularly limited as far as the airbag fabric is obtained. Hereinafter, a description according to the method will be made.

Initially, warp yarns made of the above-mentioned raw material and having the above-mentioned fineness are warped, and the resultant is set to a weaving machine. Similarly, weft yarns are prepared. Examples of this weaving machine include a water jet loom, an air jet loom, and a rapier loom. Of these looms, a water jet loom is preferred since weaving is relatively easily attained at a high speed for the purpose of heightening productivity.

From the viewpoint of yielding an airbag fabric excellent in weavability and dimension stability, the warping into the warp is performed preferably while the warping sheet tension is adjusted to 40 to 50 gf per yarn of the warp (392.4 to 490.5 mN per yarn of the warp), and the beamer sheet tension is adjusted to 70 to 90 gf per yarn of the warp (686.5 to 882.6 mN per yarn of the warp). By performing the warping under conditions in these ranges, warp yarn beams can be prepared which can result in a fabric excellent in weavability and dimension stability.

Whether or not the warping sheet tension and the beamer sheet tension each actually fall within the range can be checked, for example, by using a tension measuring instrument to measure the tension applied to any one of the warp yarns in a middle position between a position where the sheet is fed out and a position where the sheet is wound up while the weaving machine is operated.

To yield an airbag fabric with excellent dimension stability, weaving is performed while the warp yarn tension is preferably adjusted to 100 gf (981 mN) or more per yarn of the warp, more preferably to 120 gf (1177 mN) or more per yarn of the warp. The upper limit thereof is preferably set to 250 gf (2452 mN) or less per yarn of the warp, more preferably to 230 gf (2255 mN) or less per yarn of the warp. When the warp tension is preferably adjusted to 100 gf or more per yarn of the warp, gaps can be decreased between the monofilaments in a yarn bundle of the multifilament yarns that constitute the fabric so that an airbag fabric can be yielded with excellent dimension stability. When the warp tension is set to less than 100 gf per yarn of the warp, the fabric is unevenly crimped so that the fabric may not be adjusted to a target density.

Specific examples of the method of adjusting the warp tension to the above-mentioned range include a method of adjusting the warp feeding-out speed of the weaving machine, and a method of adjusting the insertion speed of the weft yarns. Whether or not the warp tension actually falls within the range can be checked, for example, by using a tension measuring instrument to measure the tension applied to any one of the warp yarns in a middle position between the warp yarn beam and the back roller while the weaving machine is operated.

After the end of the weaving step, the fabric may be optionally subjected to drying treatment in a drying step. The drying temperature is usually set to 80° C. or higher. When the temperature is set to 80° C. or higher, the fabric is made small in dry heat shrinkage to be made good in dimension stability. Thus, when expanded and deployed, the resulting airbag becomes good in its functions.

In the drying step, a dryer for one-step drying is usually used. This drier is preferably a roller drier or a suction drum-type drier. The roller drier denotes a hot frow drier to attain drying with hot wind. Any matter to be dried can be dried, without contacting any member other than a guide roll set inside the drier, while receiving a low tension. Use of such a drier makes it possible to restrain the tension applied to the fabric at the drying time so that the fabric can be sufficiently shrunk in the drying step. As a result, a fabric can be obtained with excellent dimension stability.

Next, the resulting workpiece is preferably subjected to scouring, heatsetting and/or some other processing.

The scouring temperature in the scouring step is preferably 20 to 80° C., and is more preferably 25 to 70° C. or lower. When the scouring temperature is at a predetermined temperature or higher, strain remaining in the fabric after the weaving is removed to cause the monofilaments in each of the multifilament yarns to be easily moved. Thus, the multifilament yarn can spread flatly into the fabric so that an airbag fabric excellent in dimension stability can be obtained. Conversely, when the scouring temperature is at a predetermined temperature or lower, the multifilaments are restrained from being largely shrunk so that an airbag fabric excellent in dimension stability can be obtained. The scouring period is preferably from 5 to 30 seconds.

In the same way as in the scouring step, it is preferred to set the temperature in the heatsetting processing to a heatsetting temperature which can cause strain remaining in the fabric after the weaving to be removed and can restrain the multifilament yarns from being largely shrunk. Specifically, the temperature is preferably 110 to 190° C., more preferably 120 to 190° C. When the temperature is in this range, an airbag fabric excellent in dimension stability can be obtained. The heatsetting period is preferably 10 to 300 seconds.

The airbag fabric is usable for an airbag without being coated with any resin or elastomer. The airbag fabric is also usable for an airbag that can be coated with a resin or elastomer. The airbag fabric can achieve air-impermeability, in particular, with light coating. When the fabric is coated with a resin or elastomer, the amount of the coating is preferably about 5 to 35 g/m².

The resin or elastomer is preferably one having heat resistance, cold resistance and flame retardancy. Preferred examples thereof include silicone resin, polyamide resin, polyurethane resin, and fluororesin.

The airbag is obtained by sewing the above-mentioned airbag fabric into a bag form. The airbag is used in the state of fitting, thereto, additional instruments such as an inflator. The airbag is usable, for example, in a driver seat, an assistant driver's seat or a rear seat, or as an airbag for a vehicle side surface. The airbag is particularly suitable for a driver seat or an assistant driver's seat, for which a large constraint force is required.

The airbag fabric and airbag are characterized by having excellent mechanical properties required for any airbag fabric. We thus provide an airbag improved in constraint performance for holding a passenger safely when the airbag is expanded and deployed.

EXAMPLES

The following will describe our fabrics and airbags in more detail by way of working examples.
Measuring Methods
(1) Fabric Thickness In accordance with JIS L 1096: 2010 8. 4, a sample is held under a pressure of 23.5 kPa for 10 seconds to make the thickness thereof unvaried, and then the respective thicknesses are measured at five different points of the sample using a thickness meter. The average of the measured values is then calculated.
(2) Weight Per Unit Area In accordance with JIS L 1096: 2010 8. 3. 2, three test pieces each having a size of 20 cm×20 cm are collected from a fabric, and then the respective masses (g) are measured. The average thereof is represented as the mass per square meter (g/m²) of the fabric.
(3) Densities of Warp Yarn and Weft Yarn In accordance with method A (JIS method) in JIS L 1096: 2010 8. 6. 1, the densities are measured.

A sample is put onto a flat pedestal, and unnatural creases and tension are removed therefrom. At each of five different positions, the number of the warp yarns and that of the weft yarns are counted between 2.54 cm-distance. The average value is calculated in the warp yarns as well as in the weft yarns.
(4) Tensile Strength In accordance with test method B (strip method) in JIS K 6404-3: 1999 6., five test pieces are collected for each of the warp and the weft. Each of the test pieces is adjusted to have a width of 30 mm by removing yarns from both sides of the test piece. A constant speed strain method type tester is used to pull the test piece at a cramp interval of 150 mm and a tension speed of 200 mm/min until the test piece is cut away. The maximum load is measured in the period from the start to the cut-away time. The average of the resulting measured values is calculated for the warp as well as the weft.
(5) Breaking Elongation In accordance with test method B (strip method) in JIS K 6404-3: 1999 6., five test pieces are collected for each of the warp and the weft. Each of the test pieces is adjusted to have a width of 30 mm by removing yarns from both sides of the test piece. Marked lines are drawn at the center of the test piece to have an interval of 100 mm. A constant speed strain method type tester is used to pull the test piece at a cramp interval of 150 mm and a tension speed of 200 mm/min until the test piece is cut away. The distance between the marked lines is read when the test piece is cut away. In accordance with an equation described below, the breaking elongation of the test piece is calculated. The average of the resulting measured values is calculated for the warp as well as the weft.

$$E=[(L-100)/100]\times 100$$

wherein
E: breaking elongation (%), and
L: distance between the marked lines when the test piece is cut away.
(6) Tear Strength In accordance with test method B (single tongue method) in JIS K 6404-4: 1999, 6., five test pieces each having long sides of 200 mm and short sides of 76 mm are collected for each of the warp and the weft. At the center of each short side of the test piece, a cut-away moiety is made which is perpendicular to the side and has a length of 75 mm. A constant speed strain method type tester is used to tear the test piece at a cramp interval of 75 mm and a tension speed of 200 mm/min until the test piece is torn away. At this time, the tear load is measured. The first, the second and the third largest peaks are selected from peaks of the line from which the first peak is removed in the resulting chart record line of the tear load. The average thereof is calculated. Finally, the average is calculated for the warp as well as the weft.
(7) Constant Elongation In accordance with method B (constant method for fabric) in JIS L 1096: 2010 8. 16. 1, the constant elongation is measured. Three test pieces are collected for each of the warp and the weft. Each of the test pieces is adjusted to have a width of 30 mm and a length of 400 mm by removing yarns from both sides of this fabric. A constant speed strain method type tester is used to cramp the test piece at a cramp interval of 300 mm. Marked lines are drawn thereon at an interval of 200 mm, and an initial load of 1.96 N is quietly applied thereto. At this time, the distance between the marked lines is measured. Next, a load of 98 N is quietly applied thereto, and this state is retained for 10 minutes. After the retention, the distance between the marked lines is measured. In accordance with an equation described below, the constant elongation of the test piece is calculated. The average is calculated for the warp as well as the weft.

$$EP=(L2-L1)/L1\times 100$$

wherein
EP: constant elongation (%);
L1: the distance (mm) between the marked lines when the initial load is applied to the test piece; and
L2: the distance (mm) between the marked lines after the retention for 10 minutes while a load of 98 N is applied to the test piece.
(8) Residual Strain Rate In accordance with method B (constant load method for fabric) in JIS L 1096: 2010 8. 16. 2, three test pieces are collected for each of the warp and the weft. Each of the test pieces is adjusted to have a width of 30 mm and a length of 400 mm by removing yarns from both width sides of the piece. A constant speed strain method type tester is used to cramp the test piece at a cramp interval of 300 mm. Marked lines are drawn thereon at an interval of 200 mm, and an initial load of 1.96 N is quietly applied thereto. At this time, the distance between the marked lines is measured. Next, a load of 98 N is quietly applied thereto, and this state is retained for 10 minutes. Subsequently, the load is removed and the test piece allowed to stand still for 10 minutes and, subsequently, an initial load is applied thereto. Again, the distance between the marked lines is measured. In accordance with an equation described below, the residual strain rate of the test piece is calculated. The average is calculated for the warp as well as the weft.

$$ES=(L3-L1)/L1\times100$$

wherein

ES: residual strain rate (%);

L1: the distance (mm) between the marked lines when the initial load is applied to the test piece; and L3: the distance (mm) between the marked lines when the initial load is applied to the test piece after the test piece has been allowed to stand still for 10 minutes from the removal of the 98 N load after the retention of the test piece for 10 minutes while the 98 N load is applied to the test piece.

(9) Strength in the sewn portion

Figure 1:
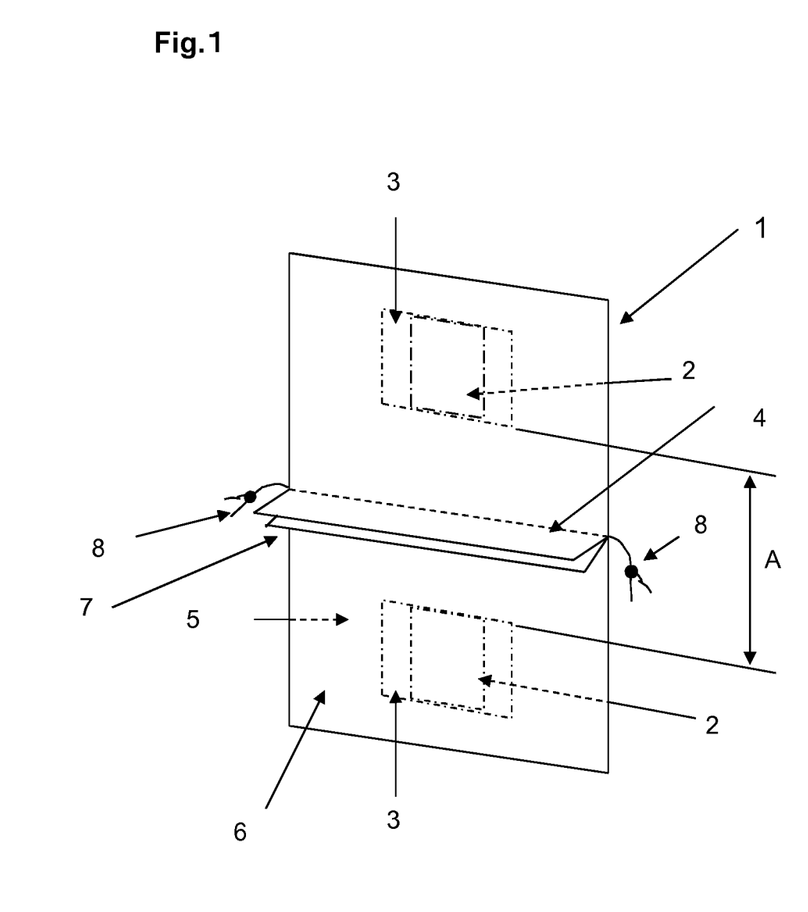
FIG. 1 is a conceptual view for describing a state where gripping jigs are used to grip a fabric-sewed test piece for measurement of strength in the sewn portion.

See FIG. 1. Three test pieces each having a width of 100 mm and a length of 170 mm were collected for each of the warp and the weft. Each of the test pieces was folded, in the longitudinal direction of the test piece, into two halves. The test piece was cut on the fold into two pieces. The resulting test pieces, the number of which is two, were sewed onto each other at respective piece-positions 15 mm apart from the respective cut ends of the pieces to prepare a sample 1 to measure strength in the sewn portion. When the test piece has a base fabric coated with resin, respective coated surfaces of the test pieces were arranged to be opposed to each other. Conditions for the sewing were as follows: a double chain sewing machine MH-380 manufactured by Juki Corporation; needles for yarn count #16; and a nylon 66 fiber having a needle thread with a fineness of 1400 dtex and a bobbin thread with a fineness of 940 dtex. The stitch number was set to 3.5 stitches per centimeter.

Next, the upper of the sample 1 to measure strength in the sewn portion was gripped with a gripping tool group having a front-side grip and a rear-side grip. In the same way, the lower of the sample 1 to measure strength in the sewn portion was gripped with another gripping tool group. The distance A between the two gripping tool groups was set to 76 mm. Regarding the respective sizes of the grips, the front-side grip at each of the upper and lower positions had a size of 25 mm×25 mm, and the rear-side grip at each of the upper and lower positions had a size of 25 mm×51 mm. When the sample has a base fabric coated with resin, the rear-side grips are positioned at the coated surface side of the base fabric. FIG. 1 illustrates such that portions of the sample 1 to measure strength in the sewn portion that are brought into contact with the front-side grips are rendered front-side grip contacting portions 2, and portions of the sample 1 that are brought into contact with the rear-side grips are rendered rear-side grip contacting portions 3. The sample 1 to measure strength in the sewn portion was gripped at both sides of the sample that were extended from a seam 4 of the sample, and then fitted to a tension tester (not illustrated). The sample was pulled at a tension speed of 200 mm/min to measure the maximum load required for cutting away the sample. The three test pieces were measured for each of the warp and the weft, and then the average of the measured values was calculated. FIG. 1 is a conceptual view to describe a state where gripping jigs are used to grip a fabric-sewed test piece for measurement of strength in the sewn portion, wherein the fabric-sewed test piece 1 is illustrated such that a surface 5 is positioned in the rear surface, and a surface 6 is positioned in the front surface, respectively. The gripping jigs are not illustrated. At each of two thread ends 8 of the seam 4, at which the piece-positions 15 mm apart from the above-mentioned cut ends, as ends 7, are sewed to each other, threads of the end 8 are tied to each other at a position outside the test piece.

The used gripping jigs were grab chucking jigs prescribed in JIS L 1096: 2010 8. 14.

(10) Slippage Amount

Figure 2:
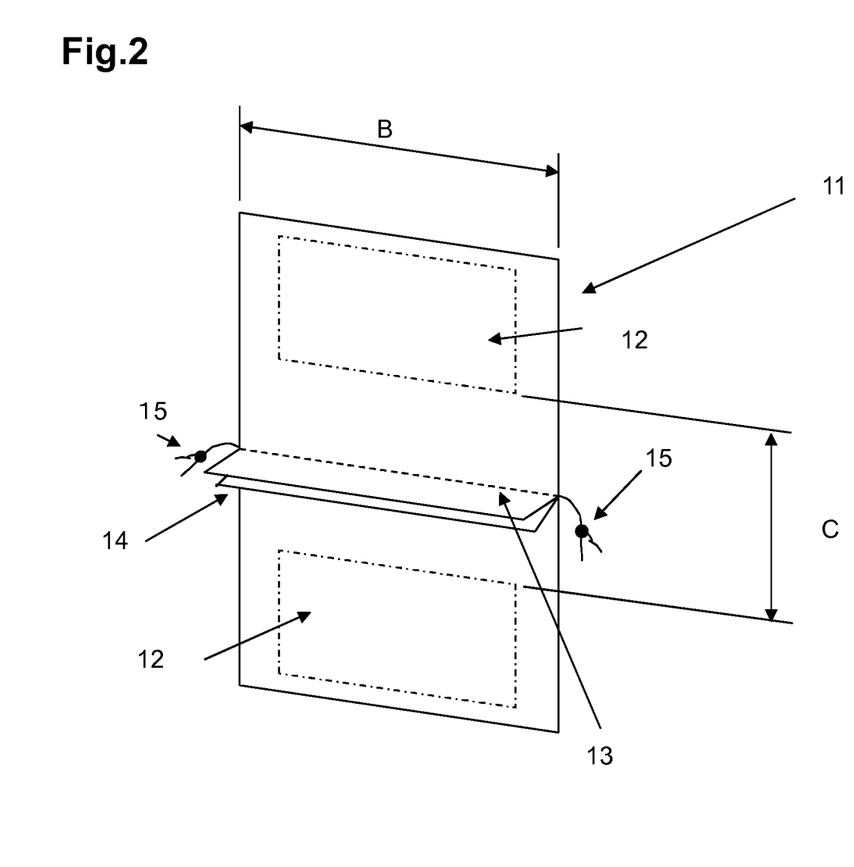
FIG. 2 is a conceptual view for describing a state where a chucking tool is used to hold a fabric-sewed test piece for measurement of slippage amount.

Two samples having a width of 7 cm in each of the warp and the weft were collected, and put onto each other in the warp (when the samples are base fabrics coated with resin, the respective coated surfaces are positioned inwards). As illustrated in FIG. 2, the samples were sewed onto each other at respective sample-positions 10 mm apart from respective ends to prepare a sample 11 for measuring slippage amount (for measurement in the warp). Conditions for the sewing were as follows: a double chain sewing machine MH-380 manufactured by Juki Corporation; needles for yarn count #16; and a nylon 66 fiber having a needle thread with a fineness of 1400 dtex and a bobbin thread with a fineness of 940 dtex. The stitch number was set to 3.5 stitches per centimeter.

Two samples having a width of 7 cm in each of the warp and the weft were collected, and put onto each other in the weft. In the same way as described above, the samples were sewed onto each other to prepare a sample 11 for measuring slippage amount (for measurement in the weft).

A 50 mm-width chuck (not illustrated) was used to grip upper and lower moieties of a seam 13 of each of the samples 11 for measuring slippage amount at respective positions of chuck contacting portions 12 of the sample 11 without chucking both 10 mm-length ends of the sample 11 in a width direction B. The cramp interval C was set to 60 mm. The sample 11 was fitted to a tension tester (not illustrated). When a tension of 1274 N was applied to the sample 11 at a tension speed of 200 mm/min, the gap between the upper and lower samples of the sample 11 was read out with a measure at five points of the sewn portion each with a large gap. The average of the five measured values was calculated. FIG. 2 is a conceptual view to describe a state where a chucking tool is used to hold a fabric-sewed test piece for measurement of slippage amount, wherein the upper and lower sample-sewed test sample 11 is held by the chuck 12, with the seam 13 being positioned at the front side of the figure. At each of both-side thread ends 15 of the seam 13, at which the upper and lower samples are sewed onto each other 10 cm apart from ends 14 of the upper and lower samples, threads of the thread end 15 are tied to each other outside the test piece 11.

Example 1

Warp Yarn and Weft Yarn

As each of a warp yarn and a weft yarn, the following were used: non-twist synthetic fiber filaments which were made of 72 monofilaments each made of nylon 66, each having a circular cross-sectional shape and each having a monofilament fineness of 6.53 dtex, and which had a total fineness of 470 dtex, a strength of 8.5 cN/dtex, and an elongation of 23%.

Warping and Beamer Steps

The warp yarn was used to produce a warp yarn beam by a warping machine under a condition of a warping sheet tension of 50 gf (490 mN) per yarn of the warp, and a beamer under a condition of a beamer sheet tension of 75 gf (735 mN) per yarn of the warp.

Weaving Step

The warp yarn beam and the weft yarn were woven into a fabric having a warp density of 55 yarns/2.54 cm, and a weft density of 55 yarns/2.54 cm by a water jet loom. The warp tension was set to 180 gf (1765 mN) per yarn of the warp. The rotational number of the weaving machine was set to 650 rpm.

Scouring and Setting Steps

Next, this fabric was scoured at 65° C. and, subsequently, a pin tenter drier was used to subject the fabric to heatsetting processing at 180° C. under the following dimension control conditions for 1 minute: a shrinkage ratio of 0% from gray fabric width with to scouring-set fabric width, and an overfeed ratio of 0%.

Results of the evaluations of the resulting airbag fabric are shown in Table 1. As shown in Table 1, this airbag fabric was excellent in mechanical properties, and also exhibited excellent characteristics in constant elongation, residual strain rate, strength in the sewn portion and slippage amount in the sewn portion.

Example 2

Warp Yarn and Weft Yarn

As each of a warp yarn and a weft yarn, the following were used: non-twist synthetic fiber filaments which were made of 136 monofilaments each made of nylon 66, each having a circular cross-sectional shape and each having a monofilament fineness of 3.46 dtex, and which had a total fineness of 470 dtex, a strength of 8.5 cN/dtex, and an elongation of 23%.

Warping and Beamer Steps

The warp yarn was used to produce a warp yarn beam by a warping machine under a condition of a warping sheet tension of 50 gf (490 mN) per yarn of the warp, and a beamer under a condition of a beamer sheet tension of 75 gf (735 mN) per yarn of the warp.

Weaving Step

The warp yarn beam and the weft yarn were woven into a fabric having a warp density of 55 yarns/2.54 cm, and a weft density of 55 yarns/2.54 cm by a water jet loom. The warp tension was set to 180 gf (1765 mN) per yarn of the warp. The rotational number of the weaving machine was set to 650 rpm.

Scouring and Setting Steps

Next, this fabric was scoured at 65° C. and, subsequently, a pin tenter drier was used to subject the fabric to heatsetting processing at 180° C. under the following dimension control conditions for 1 minute: a shrinkage ratio of 0% from gray fabric width with to scouring-set fabric width, and an overfeed ratio of 0%.

Results of the evaluations of the resulting airbag fabric are shown in Table 1. As shown in Table 1, this airbag fabric was excellent in mechanical properties, and also exhibited excellent characteristics in constant elongation, residual strain rate, strength in the sewn portion and slippage amount in the sewn portion.

Example 3

Warp Yarn and Weft Yarn

As each of a warp yarn and a weft yarn, the following were used: non-twist synthetic fiber filaments which were made of 72 monofilaments each made of nylon 66, each having a circular cross-sectional shape and each having a monofilament fineness of 6.53 dtex, and which had a total fineness of 470 dtex, a strength of 8.5 cN/dtex, and an elongation of 23%.

Warping and Beamer Steps

The warp yarn was used to produce a warp yarn beam by a warping machine under a condition of a warping sheet tension of 40 gf (392 mN) per yarn of the warp, and a beamer under a condition of a beamer sheet tension of 75 gf (735 mN) per yarn of the warp.

Weaving Step

The warp yarn beam and the weft yarn were woven into a fabric having a warp density of 46 yarns/2.54 cm, and a weft density of 46 yarns/2.54 cm by a water jet loom. The warp tension was set to 100 gf (981 mN) per yarn of the warp. The rotational number of the weaving machine was set to 700 rpm.

Scouring and Setting Steps

Next, this fabric was scoured at 65° C. and, subsequently, a pin tenter drier was used to subject the fabric to heatsetting processing at 120° C. under the following dimension control conditions for 1 minute: a shrinkage ratio of 0% from gray fabric width with to scouring-set fabric width, and an overfeed ratio of 0%.

Coating Step

Next, a floating knife coater was used to coat the outer surfaces of this fabric with a solvent-free silicone resin having a viscosity of 50 Pa·s (50,000 cP) to give an adhesion amount of 20 g/m². Thereafter, the workpiece was subjected to vulcanizing treatment at 190° C. for 1 minute to yield an airbag fabric.

Results of the evaluations of the resulting airbag fabric are shown in Table 1. As shown in Table 1, this airbag fabric was excellent in mechanical properties, and also exhibited excellent characteristics in constant elongation, residual strain rate, strength in the sewn portion and slippage amount in the sewn portion.

Example 4

Warp Yarn and Weft Yarn

As each of a warp yarn and a weft yarn, the following were used: non-twist synthetic fiber filaments which were made of 136 monofilaments each made of nylon 66, each having a circular cross-sectional shape and each having a monofilament fineness of 3.46 dtex, and which had a total fineness of 470 dtex, a strength of 8.5 cN/dtex, and an elongation of 23%.

Warping and Beamer Steps

The warp yarn was used to produce a warp yarn beam by a warping machine under a condition of a warping sheet tension of 45 gf (441 mN) per yarn of the warp, and a beamer under a condition of a beamer sheet tension of 75 gf (735 mN) per yarn of the warp.

Weaving Step

The warp yarn beam and the weft yarn were woven into a fabric having a warp density of 51 yarns/2.54 cm, and a weft density of 51 yarns/2.54 cm by a water jet loom. The warp tension was set to 190 gf (1863 mN) per yarn of the warp. The rotational number of the weaving machine was set to 660 rpm.

Scouring and Setting Steps

Next, this fabric was scoured at 65° C. and, subsequently, a pin tenter drier was used to subject the fabric to heatsetting processing at 180° C. under the following dimension control conditions for 1 minute: a shrinkage ratio of 0% from gray fabric width with to scouring-set fabric width, and an overfeed ratio of 0%.

Coating Step

Next, a floating knife coater was used to coat the outer surfaces of this fabric with a solvent-free silicone resin having a viscosity of 50 Pa·s (50,000 cP) to give an adhesion amount of 15 g/m². Thereafter, the workpiece was subjected to vulcanizing treatment at 190° C. for 1 minute to yield an airbag fabric.

Results of the evaluations of the resulting airbag fabric are shown in Table 1. As shown in Table 1, this airbag fabric was excellent in mechanical properties, and also exhibited excellent characteristics in constant elongation, residual strain rate, strength in the sewn portion and slippage amount in the sewn portion.

Example 5

Warp Yarn and Weft Yarn

As each of a warp yarn and a weft yarn, the following were used: non-twist synthetic fiber filaments which were made of 72 monofilaments each made of nylon 66, each having a circular cross-sectional shape and each having a monofilament fineness of 6.53 dtex, and which had a total fineness of 470 dtex, a strength of 8.5 cN/dtex, and an elongation of 23%.

Warping and Beamer Steps

The warp yarn was used to produce a warp yarn beam by a warping machine under a condition of a warping sheet tension of 50 gf (490 mN) per yarn of the warp, and a beamer under a condition of a beamer sheet tension of 75 gf (735 mN) per yarn of the warp.

Weaving Step

The warp yarn beam and the weft yarn were woven into a fabric having a warp density of 55 yarns/2.54 cm, and a weft density of 55 yarns/2.54 cm by a water jet loom. The warp tension was set to 190 gf (1863 mN) per yarn of the warp. The rotational number of the weaving machine was set to 660 rpm.

Scouring and Setting Steps

Next, this fabric was scoured at 65° C. and, subsequently, a pin tenter drier was used to subject the fabric to heatsetting processing at 180° C. under the following dimension control conditions for 1 minute: a shrinkage ratio of 0% from gray fabric width with to scouring-set fabric width, and an overfeed ratio of 0%.

Coating Step

Next, a floating knife coater was used to coat the outer surfaces of this fabric with a solvent-free silicone resin having a viscosity of 50 Pa·s (50,000 cP) to give an adhesion amount of 20 gf/m². Thereafter, the workpiece was subjected to vulcanizing treatment at 190° C. for 1 minute to yield an airbag fabric.

Results of the evaluations of the resulting airbag fabric are shown in Table 1. As shown in Table 1, this airbag fabric was excellent in mechanical properties, and also exhibited excellent characteristics in constant elongation, residual strain rate, strength in the sewn portion and slippage amount in the sewn portion.

TABLE 1

|  |  | Example 1 | Example 2 | Example 3 | Example 4 | Example 5 |
| --- | --- | --- | --- | --- | --- | --- |
| Total fineness | dtex | 470 | 470 | 470 | 470 | 470 |
| Filament number | f | 72 | 136 | 72 | 136 | 72 |
| Monofilament fineness | dtex | 6.53 | 3.46 | 6.53 | 3.46 | 6.53 |
| Densities (warp/weft) | yarns/2.54 cm | 55/55 | 55/55 | 46/46 | 51/51 | 55/55 |
| Weight per unit area | g/m² | 219.4 | 228.5 | 198.0 | 224.9 | 238.8 |
| Resin adhesion amount | g/m² | — | — | 20 | 15 | 20 |
| Thickness | mm | 0.33 | 0.33 | 0.28 | 0.31 | 0.33 |
| Cover factor | — | 2262 | 2262 | 1892 | 2098 | 2262 |
| Warping sheet tension | mN per yarn | 490 | 490 | 392 | 441 | 490 |
| Beamer sheet tension | mN per yarn | 735 | 735 | 735 | 735 | 735 |
| Warp tension for weaving | mN per yarn | 1765 | 1765 | 981 | 1863 | 1863 |
| Refining temperature | ° C. | 65 | 65 | 65 | 65 | 65 |
| Set temperature | ° C. | 180 | 180 | 120 | 180 | 180 |
| Tension strengths (warp/weft) | N/cm | 750/768 | 745/785 | 674/659 | 732/737 | 775/732 |
| Elongations (warp/weft) | % | 34.8/26.1 | 35.2/27.6 | 27.5/26.5 | 29.8/26.8 | 31.1/26.9 |
| Tear strengths (warp/weft) | N | 268/267 | 183/197 | 427/425 | 420/451 | 380/399 |
| Constant elongations (warp/weft) | % | 2.6/1.5 | 2.9/1.6 | 1.9/5.0 | 1.0/1.3 | 1.9/2.9 |
| Residual strain rates (warp/weft) | % | 0.5/0.4 | 0.4/0.4 | 0.3/1.5 | 0.1/0.4 | 0.2/0.4 |
| Strengths in sewn portion (warp/weft) | N | 1411/1355 | 1678/1702 | 1296/1263 | 1762/1749 | 1640/1731 |
| Slippage amounts in sewn portion (warp/weft) | mm | 0.9/0.8 | 0.8/0.8 | 1.3/1.4 | 1.2/1.0 | 1.0/0.9 |

Comparative Example 1

Warp Yarn and Weft Yarn

As each of a warp yarn and a weft yarn, the following were used: non-twist synthetic fiber filaments which were made of 72 monofilaments each made of nylon 66, each having a circular cross-sectional shape and each having a monofilament fineness of 6.53 dtex, and which had a total fineness of 470 dtex, a strength of 8.5 cN/dtex, and an elongation of 23%.

Warping and Beamer Steps

The warp yarn was used to produce a warp yarn beam by a warping machine under a condition of a warping sheet tension of 35 gf (343 mN) per yarn of the warp, and a beamer under a condition of a beamer sheet tension of 60 gf (588 mN) per yarn of the warp.

Weaving Step

The warp yarn beam and the weft yarn were woven into a fabric having a warp density of 43 yarns/2.54 cm, and a weft density of 43 yarns/2.54 cm by a water jet loom. The warp tension was set to 100 gf (981 mN) per yarn of the warp. The rotational number of the weaving machine was set to 700 rpm.

Scouring and Setting Steps

Next, this fabric was scoured at 65° C. and, subsequently, a pin tenter drier was used to subject the fabric to heatsetting processing at 120° C. under the following dimension control conditions for 1 minute: a shrinkage ratio of 0% from gray fabric width with to scouring-set fabric width, and an overfeed ratio of 0%.

Results of the evaluations of the resulting airbag fabric are shown in Table 2. As shown in Table 2, this airbag fabric was poor in constant elongation, residual strain rate, strength in the sewn portion, and slippage amount in the sewn portion.

Comparative Example 2

Warp Yarn and Weft Yarn

As each of a warp yarn and a weft yarn, the following were used: non-twist synthetic fiber filaments which were made of 72 monofilaments each made of nylon 66, each having a circular cross-sectional shape and each having a monofilament fineness of 6.53 dtex, and which had a total fineness of 470 dtex, a strength of 8.5 cN/dtex, and an elongation of 23%.

Warping and Beamer Steps

The warp yarn was used to produce a warp yarn beam by a warping machine under a condition of a warping sheet tension of 35 gf (343 mN) per yarn of the warp, and a beamer under a condition of a beamer sheet tension of 65 gf (637 mN) per yarn of the warp.

Weaving Step

The warp yarn beam and the weft yarn were woven into a fabric having a warp density of 52 yarns/2.54 cm, and a weft density of 48 yarns/2.54 cm by a water jet loom. The warp tension was set to 80 gf (785 mN) per yarn of the warp. The rotational number of the weaving machine was set to 650 rpm.

Scouring and Setting Steps

Next, this fabric was scoured at 65° C. and, subsequently, a pin tenter drier was used to subject the fabric to heatsetting processing at 180° C. under the following dimension control conditions for 1 minute: a shrinkage ratio of 0% from gray fabric width with to scouring-set fabric width, and an overfeed ratio of 0%.

Results of the evaluations of the resulting airbag fabric are shown in Table 2. As shown in Table 2, this airbag fabric was excellent in mechanical properties, but was poor in constant elongation in the weft, residual strain rate in the weft, and strength in the sewn portion in the weft.

Comparative Example 3

Warp Yarn and Weft Yarn

As each of a warp yarn and a weft yarn, the following were used: non-twist synthetic fiber filaments which were made of 136 monofilaments each made of nylon 66, each having a circular cross-sectional shape and each having a monofilament fineness of 3.46 dtex, and which had a total fineness of 470 dtex, a strength of 8.5 cN/dtex, and an elongation of 23%.

Warping and Beamer Steps

The warp yarn was used to produce a warp yarn beam by a warping machine under a condition of a warping sheet tension of 50 gf (490 mN) per yarn of the warp, and a beamer under a condition of a beamer sheet tension of 75 gf (735 mN) per yarn of the warp.

Weaving Step

The warp yarn beam and the weft yarn were woven into a fabric having a warp density of 55 yarns/2.54 cm, and a weft density of 55 yarns/2.54 cm by a water jet loom. The warp tension was set to 180 gf (1765 mN) per yarn of the warp. The rotational number of the weaving machine was set to 650 rpm.

Scouring and Setting Steps

Next, this fabric was scoured at 80° C. and, subsequently, a pin tenter drier was used to subject the fabric to heatsetting processing at 80° C. under the following dimension control conditions for 1 minute: a shrinkage ratio of 0% from gray fabric width with to scouring-set fabric width, and an overfeed ratio of 0%.

Results of the evaluations of the resulting airbag fabric are shown in Table 2. As shown in Table 2, this airbag fabric was excellent in mechanical properties, but was poor in residual strain rate.

Comparative Example 4

Warp Yarn and Weft Yarn

As each of a warp yarn and a weft yarn, the following were used: non-twist synthetic fiber filaments which were made of 136 monofilaments each made of nylon 66, each having a circular cross-sectional shape and each having a monofilament fineness of 3.46 dtex, and which had a total fineness of 470 dtex, a strength of 8.5 cN/dtex, and an elongation of 23%.

Warping and Beamer Steps

The warp yarn was used to produce a warp yarn beam by a warping machine under a condition of a warping sheet tension of 40 gf (392 mN) per yarn of the warp, and a beamer under a condition of a beamer sheet tension of 75 gf (735 mN) per yarn of the warp.

Weaving Step

The warp yarn beam and the weft yarn were woven into a fabric having a warp density of 46 yarns/2.54 cm, and a weft density of 46 yarns/2.54 cm by a water jet loom. The warp tension was set to 30 gf (294 mN) per yarn of the warp. The rotational number of the weaving machine was set to 700 rpm.

Scouring and Setting Steps

Next, this fabric was refined at 100° C. and, subsequently, a pin tenter drier was used to subject the fabric to heatsetting processing at 100° C. under the following dimension control conditions for 1 minute: a shrinkage ratio of 0% from gray fabric width with to scouring-set fabric width, and an overfeed ratio of 0%.

Coating Step

Next, a floating knife coater was used to coat the outer surfaces of this fabric with a solvent-free silicone resin having a viscosity of 50 Pa·s (50,000 cP) to give an adhesion amount of 20 gf/m². Thereafter, the workpiece was subjected to vulcanizing treatment at 190° C. for 1 minute to yield an airbag fabric.

Results of the evaluations of the resulting airbag fabric are shown in Table 2. As shown in Table 2, this airbag fabric was excellent in mechanical properties, but was poor in residual strain rate.

TABLE 2

|  |  | Comparative Example 1 | Comparative Example 2 | Comparative Example 3 | Comparative Example 4 |
| --- | --- | --- | --- | --- | --- |
| Total fineness | dtex | 470 | 470 | 470 | 470 |
| Filament number | f | 72 | 72 | 136 | 136 |
| Monofilament fineness | dtex | 6.53 | 6.53 | 3.46 | 3.46 |
| Densities (warp/weft) | yarns/2.54 cm | 43/43 | 52/48 | 55/55 | 46/46 |
| Weight per unit area | g/m$^2$ | 165.5 | 204.7 | 227.5 | 202.5 |
| Resin adhesion amount | g/m$^2$ | — | — | — | 20 |
| Thickness | mm | 0.27 | 0.30 | 0.33 | 0.28 |
| Cover factor | — | 1769 | 2057 | 2262 | 1892 |
| Warping sheet tension | mN per yarn | 343 | 343 | 490 | 392 |
| Beamer sheet tension | mN per yarn | 588 | 637 | 735 | 735 |
| Warp tension for weaving | mN per yarn | 981 | 785 | 1765 | 294 |
| Refining temperature | °C. | 65 | 65 | 80 | 100 |
| Set temperature | °C. | 120 | 180 | 80 | 100 |
| Tension strengths (warp/weft) | N/cm | 605/598 | 721/703 | 721/699 | 653/644 |
| Elongations (warp/weft) | % | 26.9/26.7 | 28.5/26.6 | 32.3/27.0 | 27.1/26.0 |
| Tear strengths (warp/weft) | N | 450/467 | 358/387 | 202/192 | 443/432 |
| Constant elongations (warp/weft) | % | 6.2/6.1 | 2.2/7.3 | 5.4/4.9 | 4.3/5.5 |
| Residual strain rates (warp/weft) | % | 2.4/2.2 | 0.3/3.7 | 2.5/2.1 | 1.9/2.0 |
| Strengths in sewn portion (warp/weft) | N | 850/839 | 1353/1128 | 1256/1193 | 1056/1121 |
| Slippage amounts in sewn portion (warp/weft) | mm | 2.3/2.5 | 1.4/1.6 | 0.9/1.0 | 2.0/1.9 |

INDUSTRIAL APPLICABILITY

The airbag fabric keeps excellent properties required for airbag fabrics. Moreover, the airbag fabric is favorably usable, particularly, for airbags for a driver seat and an assistant driver's seat, a side airbag against lateral collision, a curtain airbag, and other airbags.

The invention claimed is:

1. An airbag fabric comprising a synthetic fiber, the fabric having a constant elongation of 1 to 5% and a residual strain rate of 0.1 to 1.5% in each of a warp and a weft of the fabric, and the constant elongation and the residual strain rate being calculated by measuring methods below, respectively:

constant elongation $(EP)$ $(\%)=(L2-L1)/L1 \times 100$, and residual strain rate $(ES)$ $(\%)=(L3-L1)/L1 \times 100$ wherein L1: a distance between marked lines on the fabric when an initial load of 1.96 N/30 mm is applied to the fabric;

L2: a distance between the marked lines after the fabric has been retained for 10 minutes while a load of 98 N/30 mm has been applied to the fabric; and L3: a distance between the marked lines when the initial load of 1.96 N/30 mm is applied to the fabric after the fabric has been allowed to stand still for 10 minutes from the removal of the 98 N/30 mm load after the retention of the fabric for 10 minutes while the 98 N/30 mm load is applied to the fabric.

2. The airbag fabric according to claim 1, which has a strength in a sewn portion of 1200 N or more in each of the warp and the weft.

3. The airbag fabric according to claim 1, wherein a warp yarn and a weft yarn each have a total fineness of 350 to 700 dtex, and each have a monofilament fineness of 2.5 to 7 dtex.

4. The airbag fabric according to claim 2, wherein a warp yarn and a weft yarn each have a total fineness of 350 to 700 dtex, and each have a monofilament fineness of 2.5 to 7 dtex.

5. The airbag fabric according to claim 1, which has a cover factor of 1800 to 2300.

6. The airbag fabric according to claim 2, which has a cover factor of 1800 to 2300.

7. The airbag fabric according to claim 3, which has a cover factor of 1800 to 2300.

8. An airbag comprising the airbag fabric according to claim 1.

9. An airbag comprising the airbag fabric according to claim 2.

10. An airbag comprising the airbag fabric according to claim 3.

11. An airbag comprising the airbag fabric according to claim 4.

12. A method of producing an airbag fabric, using a weaving machine to produce the airbag fabric according to claim 1, wherein warping into the warp is performed under conditions of using a warping sheet tension of 40 to 50 gf per yarn of the warp (392 to 490 mN per yarn of the warp), and a beamer sheet tension of 70 to 90 gf per yarn of the warp (686 to 883 mN per yarn of the warp).

13. The method according to claim 12, wherein the weaving is performed under a condition of using a warp tension of the weaving of 100 to 250 gf per yarn of the warp (981 to 1961 mN per yarn of the warp).

14. A method of producing an airbag fabric comprising, after the weaving recited in claim 12, scouring a resultant workpiece at a temperature of 20 to 80° C., and further heatsetting a scoured workpiece at a temperature of 110 to 190° C.

15. A method of producing an airbag fabric comprising, after the weaving recited in claim 13, scouring a resultant workpiece at a temperature of 20 to 80° C., and further heatsetting a scoured workpiece at a temperature of 110 to 190° C.

\* \* \* \* \*